US010575533B2

(12) United States Patent
Kloos et al.

(10) Patent No.: US 10,575,533 B2
(45) Date of Patent: Mar. 3, 2020

(54) FILLING FOODSTUFFS HAVING A SOLID AND A LIQUID COMPONENT

(71) Applicant: Albert Handtmann Maschinenfabrik GmbH & Co. KG, Biberach (DE)

(72) Inventors: Daniel Kloos, Ringschnait (DE); Martin Staudenrausch, Biberach (DE); Uwe Wiemann, Lienen (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 450 days.

(21) Appl. No.: 15/436,672

(22) Filed: Feb. 17, 2017

(65) Prior Publication Data
US 2017/0238564 A1 Aug. 24, 2017

(30) Foreign Application Priority Data
Feb. 19, 2016 (EP) ................................ 16156463

(51) Int. Cl.
*A22C 11/00* (2006.01)
*A22C 11/02* (2006.01)
*A23L 13/60* (2016.01)
*A22C 5/00* (2006.01)

(52) U.S. Cl.
CPC ............... *A22C 11/02* (2013.01); *A22C 5/00* (2013.01); *A22C 11/0245* (2013.01); *A23L 13/65* (2016.08); *A23V 2002/00* (2013.01)

(58) Field of Classification Search
CPC ..... A22C 11/00; A22C 11/02; A22C 11/0209; A22C 11/0227

USPC ..................... 452/30–32, 35–37, 46–48, 51
See application file for complete search history.

(56) References Cited

U.S. PATENT DOCUMENTS

| 3,835,503 A | 9/1974 | Townsend et al. |
| 5,953,984 A * | 9/1999 | Moessmer ............. A22C 11/08 241/282.1 |
| 6,264,541 B1 * | 7/2001 | Zerbst ................ A22C 11/0245 452/27 |
| 7,029,387 B2 * | 4/2006 | van den Nieuwelaar ................... A22C 17/04 452/135 |
| 7,591,717 B2 * | 9/2009 | Bachtle .............. A22C 11/0209 452/30 |
| 7,887,398 B2 * | 2/2011 | Packer ..................... A22B 5/18 452/134 |
| 8,678,885 B2 * | 3/2014 | Staudenrausch ....... A22C 11/08 452/31 |
| 2016/0008856 A1 | 1/2016 | Maile et al. |

FOREIGN PATENT DOCUMENTS

| DE | 47634 C | 11/1888 |
| EP | 2965630 A1 | 1/2016 |
| FR | 3022115 A1 | 12/2015 |
| GB | 180448 | 6/1922 |
| GB | 1315072 | 4/1973 |

* cited by examiner

Primary Examiner — Richard T Price, Jr.
(74) Attorney, Agent, or Firm — McCoy Russell LLP

(57) ABSTRACT

The present disclosure relates to a method and a filling machine for filling foodstuffs comprising a predetermined proportion of pieces of filling in a liquid. The pieces of filling are charged into a hopper and liquid is during the filling process added into the lower region of the hopper.

17 Claims, 5 Drawing Sheets

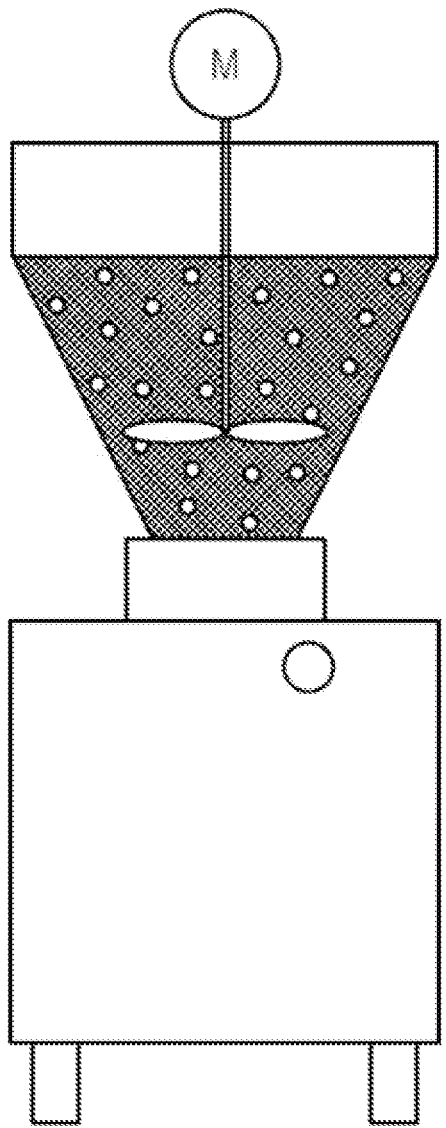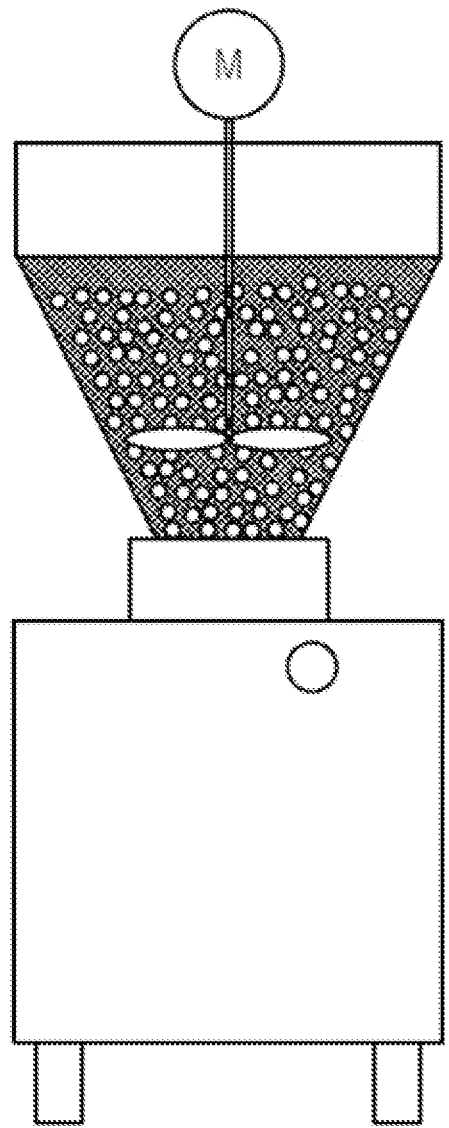
FIG. 5A
PRIOR ART
FIG. 5B
PRIOR ART

FILLING FOODSTUFFS HAVING A SOLID AND A LIQUID COMPONENT

CROSS-REFERENCE TO RELATED APPLICATION

The present application claims priority to European Patent Application No. 16 156 463.8, entitled "Filling Foodstuffs Having a Solid and a Liquid Component," filed on Feb. 19, 2016, the entire contents of which are hereby incorporated by reference for all purposes.

TECHNICAL FIELD

The present disclosure relates to a method for charging foodstuffs as well as to a filling machine.

BACKGROUND AND SUMMARY

In the production of foodstuffs, in particular the production of sausage, which comprises a predetermined proportion of pieces of filling in liquid, considerable problems arise in the production process. Such foods are, for example, sausages with meat and/or vegetable filling in aspic, goulash soup, or fish salads. Up to a mixing ratio of about 50% filling to 50% liquid component, in particular 40% filling to 60% liquid component, the filling in the prior art can with the aid of stirrers or a mixing curve with a separate drive be flushed up so as to homogeneously distribute the filling in the liquid, as is shown, for example, in FIG. 5A. As the filling component increases, the liquid component is too little to flush up the filling. The latter in the prior art is then more and more destroyed by stirring, instead of being homogeneously distributed, for example, as shown in FIG. 5B.

When the filling can in the liquid no longer be stirred up and homogeneously distributed in the liquid for the reason that the filling component is too large, production is as follows:

The finished mixture is with scoops or similar tools manually filled into casings, trays, deep drawing systems or other containers. The mixing ratio is monitored visually by the filler.

It is also possible that the filling is first (manually or mechanically) charged into the container etc. separate from the liquid, whereby the filling can be controlled by way of a scale. The container is then charged with the liquid component. This can also be done manually or mechanically by determining a certain volume.

Both methods are very complex, cost-intensive and achieve only a relatively low hourly output (Kg/h) per person. It is additionally in the second method of operation difficult to fill the filling in a manner that is gentle to the product. Moreover, exact adjustment of a predetermined proportion of pieces of filling in the liquid is not possible. Homogeneous distribution is also not ensured.

Proceeding from there, the present disclosure is based on the object of providing an improved method and an improved device for filling foodstuffs having a predetermined proportion of pieces of filling in a liquid which in a simple manner ensure that a uniform determined ratio of a liquid component relative to the solid filling is maintained while simultaneously maintaining a high productivity.

In an example method according to the present disclosure, the pieces of filling may now be introduced without liquid (or at least with a smaller proportion of liquid than that of the foodstuffs or the final product to be filled) into the hopper of, for example, a filling machine. Liquid is during the filling process added in the lower region of the hopper. The lower region is understood to be, for example, the lower 10 to 50%, in particular the lower 30%, of the total height of a hopper. By injecting the liquid into the lower hopper region, it may be prevented that the filling becomes wedged in the conically tapering hopper. The filling can therefore be rinsed free and flushed up in the lower region of the hopper and in this state enter a conveying mechanism which adjoins the lower region of the hopper. The completely mixed foodstuffs can thus be conveyed at a predetermined ratio of pieces of filling relative to the liquid from the hopper and filled via a dosing element, such as, for example, a stuffing tube, into a container such as, for example, a sausage casing, a tray, a deep drawing system, etc. A specific ratio of liquid to filling can thereby in a simple manner be adjusted by introducing the liquid into the lower region and the food product can be manufactured continuously and in an automated manner. Homogeneous distribution of the filling may also be ensured. A high throughput can be obtained with the method according to the present disclosure. The method according to the present disclosure can also be performed in an automated manner.

It is particularly advantageous that a certain amount of liquid may for the purpose of adjusting a certain liquid component during the filling process added per time, corresponding to a certain amount of liquid per quantity or volume of mixed foodstuffs discharged. In particular, the delivery capacity (for example volume/time) of a pump which adds the liquid can be controlled or regulated accordingly. With an increase in the delivery capacity, the liquid content in the foodstuffs to be filled and therefore in the finished product also increases.

The added quantity of liquid can be regulated, for example, via the control device of a filling machine which performs the portioning.

Alternatively or additionally, it is also possible that the liquid charging level in the hopper is adjusted, in particular regulated, for adjusting a certain proportion of liquid. The higher the liquid charging level, the more liquid component is in the foodstuffs or the finished product, respectively. The liquid charging level can be determined, e.g. visually via an inspection glass or by way of a suitable sensor.

The charging level can then be regulated, e.g. as a control variable by the pump as the actuating element.

It is also possible that the charging level of the pieces of filling is determined, e.g. likewise visually via an inspection glass at the hopper edge or by way of a suitable sensor, and the charging level may be set to a predetermined value or range, where in particular the charging level may be set or regulated so low that it is less than 10% to 50% of the hopper height. The charging level may be set higher than the height of the feeding device for the liquid so that the liquid can spread in the pieces of filling. It is advantageous to keep the charging level in the hopper as low as possible. This prevents damage to the filling, in particular the filling from becoming wedged, and promotes the filling to be homogeneously distributed and flushed up due to the reduced pressure.

Charging the hopper with pieces of filling can be done, for example, by way of a conveying devices, where the delivery capacity (for example, kg/h) is regulated in dependency of the measured charging level of the pieces of filling. A continuous manufacturing process is therefore possible in a simple manner.

According to the present disclosure, the predetermined proportion of the pieces of filling may be in a range of from 30% to 80% of the total foodstuffs (corresponding to 70% to 20% of liquid component), in particular in a range from 40% to 70% % (corresponding to 60% to 30% of liquid component). The volume of a piece of filling is e.g. in a range of 1 cm$^3$ to 80 cm$^3$. This method is particularly advantageous with the pieces of filling having a proportion of >50%.

The pieces of filling can comprise at least one filling from the following group: pieces of meat, pieces of vegetable, fish cuttings, etc. The liquid can be a liquid in particular from the following group: liquid aspic, oils, salad dressings, gravy, soups, stock, etc.

The liquid can be introduced in such a manner that it comprises a motion component in the horizontal direction. This means that the liquid at least in part expands and moves laterally, which promotes homogeneous distribution in the hopper. For example, openings in the side region of a feeding device facing the hopper wall can be provided for this purpose. Also tangential introduction of the liquid is possible, setting the content in the hopper into a rotational motion.

The present disclosure also relates to a filling machine with a hopper for receiving pieces of filling and a conveying mechanism for conveying the foodstuffs from the hopper to a dosing element. Furthermore, a feeding device for feeding liquid into a lower region of the hopper may be provided. A feeding device for feeding liquid into the lower region means that the feeding device has at least one outlet opening for the liquid in the lower region.

The feeding device there comprises, for example, a line opening into the lower region of the hopper and a pump. The line, which may extend into the hopper and is designed, for example, as a lance, is configured such that the direction of motion of the liquid when exiting is substantially horizontal or at least has a directional component in the horizontal direction. The line can there, e.g. at least in sections be disposed centered in the hopper and comprise lateral outlet openings. However, it is also possible that the lines e.g. at their lower end comprise a distributor device having a plurality of outlet openings, e.g. lateral outlet openings. Such configuration allows for a particular uniform flush-up. It is also possible for the line to be configured to be rotatable about its longitudinal axis and to be rotated by a motor. The line can also according to another embodiment from the exterior open into a tangential inlet at the hopper such that the liquid is introduced substantially tangential to the hopper wall so that the liquid in the conically tapering hopper is caused to rotate.

Advantageously, the device may comprise a charging level sensor for measuring the charging level of the liquid and/or a charging level sensor for measuring the charging level of the pieces of filling.

The filling machine may comprise a control device which actuates the pump in order to obtain a predetermined proportion of liquid in the foodstuffs. The drive of the pump may be connected to this control device. According to at least one embodiment, the pump is the conveying mechanism of a second filling machine, in the hopper of which the liquid for the foodstuffs is stored. The liquid from the second machine can thereby be fed into the lower region of the hopper of the first filling machine. For this purpose, the conveying mechanism, in particular the control device of the second filling machine, may be connected via an interface to the first filling machine, i.e. to its control device. It is also possible that the pump is a separate liquid pump which feeds the liquid from a container to the hopper of the filling machine. This pump can comprise a separate drive but can also be driven via a drive of the first filling machine. The line can comprise a valve, in particular a check valve, to prevent uncontrolled return leakage of the liquid into the hopper.

The present disclosure shall be explained below in more detail with reference to the following figures.

BRIEF DESCRIPTION OF THE FIGURES

FIGS. 5A and 5B show filling machines according to prior art.

DETAILED DESCRIPTION

Figure 1:
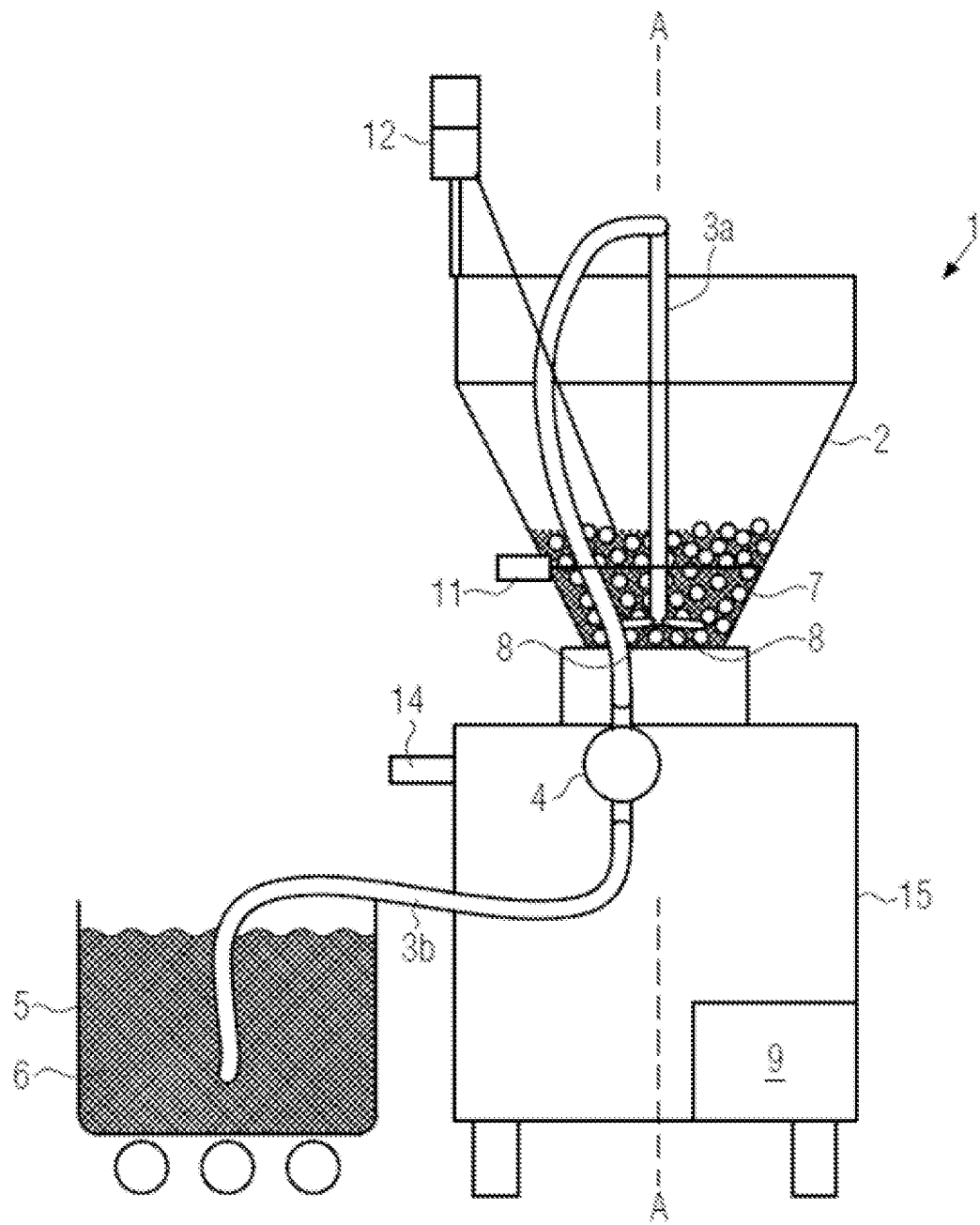
FIG. 1 very schematically shows a longitudinal sectional view through a first embodiment according to the present disclosure with a filling machine.

FIG. 1 shows a first embodiment of the present disclosure. Filling machine 1, for example a vacuum filling machine, comprises a hopper 2 which at least in sections tapers conically downwardly.

Adjoining the lower end of the hopper is a conveying mechanism (not shown) which can for filling foodstuffs transport or push the hopper contents to a dosing element 14, e.g. a stuffing tube 14. In the present disclosure, foodstuffs are filled which comprise a predetermined proportion of pieces of filling 7 in a liquid 6. The proportion of the pieces of filling in the entire foodstuffs may be in a range from 30% to 80%, in particular in a range from 40% to 70%. The volume of the pieces of filling is, for example, in a range from 1 cm$^3$ to 80 cm$^3$. The pieces of filling can comprise, e.g. a filling from the following group: pieces of meat, pieces of vegetable, fish cuttings, etc. The liquid can be a liquid in particular from the following group: liquid aspic, oils, salad dressings, gravy, soups, stock, etc. The filling machine further comprises a housing 15.

According to the present disclosure, filling machine 1 now comprises a feeding device comprising 3a, 3b, 5, and 4 for feeding liquid 6 into the lower region of hopper 2. Lower region presently means, for example, the lower 10% to 50%, and in at least one example, the lower 30% of the entire height of hopper 2. In this embodiment, the feeding device comprises a container 5 which is placed, for example, adjacent to the housing of filling machine 1 and particularly advantageously is configured to be movable on wheels. Liquid 6 is accommodated in container 5. The volume of the container is e.g. in a range from 100 l-300 l. If the liquid needs to have a certain temperature, for example, in the case of warm liquid aspic, container 5 can be configured to be heatable. The feeding device further comprises a line 3b, 3a, via which liquid 6 can be piped into the lower region of hopper 2. In this case, the line is at least in sections configured as a flexible hose. In order to deliver liquid 6 into the lower region of hopper 2, the feeding device further comprises a pump 4 in line 3b, 3a.

Pump 4 can be a separate pump, e.g. a hose, gearwheel, or rotary vane pump, etc., which is actuated, for example, by control device 9 in filling machine 1 which also controls the other functional elements of the filling machine, such as, for example, the conveying mechanism. However, pump 4 can be a pump which is driven via a drive of filling machine 1. This drive can be integrated into the filling machine. This means that a corresponding delivery pump can be coupled to the filling machine without its own drive and does not comprise its own drive and can be driven by a drive already existing for other functions. A respective delivery pump can therefore be retrofitted in a simple manner. However, it is also possible to provide a delivery pump with its own drive. The line, in particular line section 3a, downstream of delivery pump 4 extends at least in part into the interior of hopper 2, where at least one outlet opening 8 opens into the lower region of hopper 2 in order to there introduce liquid. In this embodiment, line section 3a projecting into the hopper interior is configured as a lance. Outlet openings 8 are in at least one example arranged on the side of the line such that the openings, which are distributed around the circumference of the line, are facing the wall of hopper 2. Liquid can therefore flow from a centrally arranged line 3a to the outer walls of hopper 2, which leads to improved flushing-up and therefore to homogeneous distribution of the filling.

Moreover, it is also possible that line 3a or the lance, respectively, is configured to be rotatable about the axis by way of a respective drive, which can further promote flushing up the filling.

Figure 4:
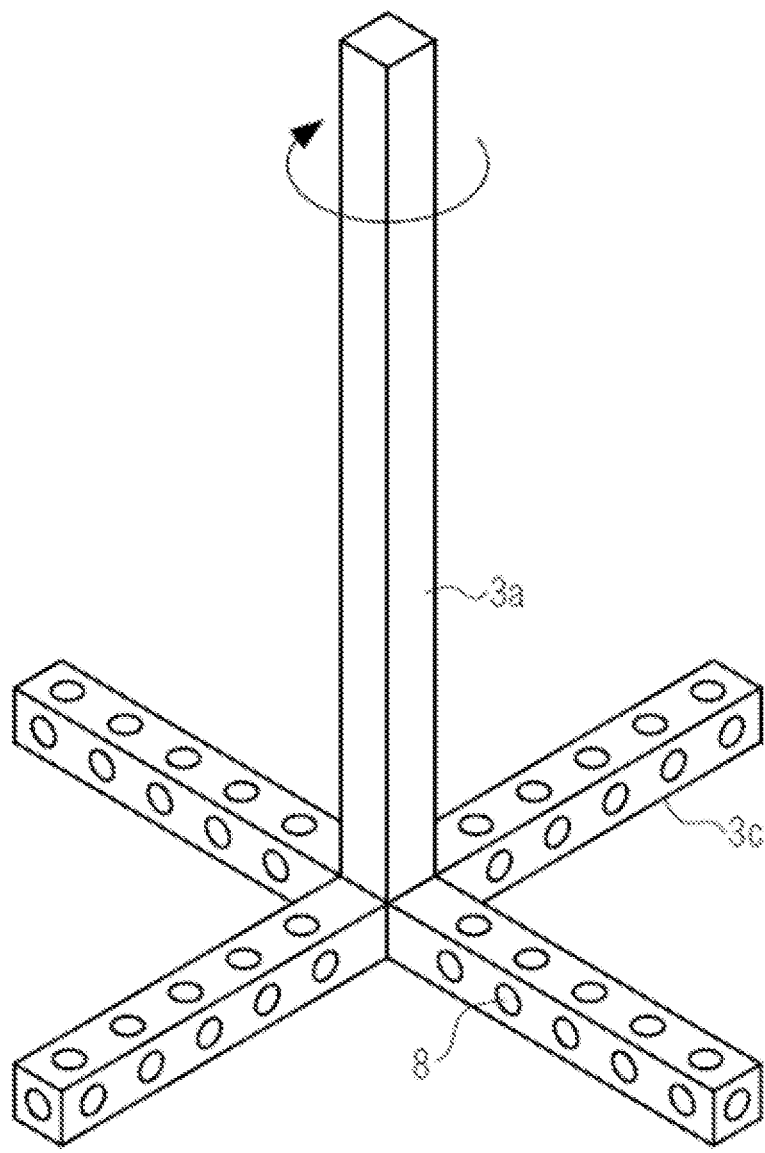
FIG. 4 very schematically shows a line with a distributor device.

Although not shown, a distributor device 3c, for example, in the form of at least one laterally extending line section, can be provided at the end of line 3a via which liquid can be introduced into hopper 2. FIG. 4 only by way of example shows a respective distributor device 3c which adjoins the lower end of line 3a and which comprises several lateral outlet openings. In addition, outlet openings can also be provided in the upper and/or lower region of the distributor device. FIG. 4 is only one example of a possible distributor device.

Provided in line 3a can be a valve (not shown), in particular an actuated or self-regulating valve, for example a check valve, in particular at the lower end of line 3a, in order to prevent the liquid from flowing back in an uncontrolled manner, thereby changing the mixing ratio between the solid component and the liquid in an uncontrolled manner, when the device is temporarily stopped.

Filling machine 1 further comprises a charging level sensor 11 which can measure the charging level of the liquid in hopper 2. For example, an optical or capacitive sensor, or a radar or ultrasonic sensor, etc. can be used as a respective charging level sensor. In addition, a charging level sensor 12 is also provided for filling 7. For example, an optical or capacitive sensor, or a radar or ultrasonic sensor, etc. can be a respective charging level sensor. Both the charging level sensor for liquid 11 as well as the charging level sensor for filling 12 can be connected to control device 9.

Although not shown, filling machine 1 can comprise a conveying device (for example a conveyor belt) which conveys the pieces of filling into hopper 2. This conveying device can be, for example, a conveyor belt controlled by way of charging level sensor 12. The charging level can thereby be set to or controlled for a certain value, e.g. in such a manner that the charging level is e.g. less than 10% to 50% of the hopper height. It is advantageous to keep the charging level in the hopper as low as possible (but higher than the feeding device). This prevents damage to the filling, in particular the filling from becoming wedged, and promotes the filling to be homogeneously distributed and flushed up due to the reduced pressure.

The proportion of liquid in the foodstuffs, i.e. in the finished product, can be controlled or regulated, for example, via the delivery capacity of pump 4 which adds liquid 6. With an increase in the delivery rate, the proportion of liquid in the foodstuffs to be filled and therefore in the finished product increases (at a constant delivery rate of the conveying mechanism of the filling machine). For this purpose, control device 9 comprises, for example, a respective control unit. A set point value for the delivery capacity of pump 4 for a desired proportion of liquid can be determined e.g. experimentally in advance.

Alternatively or additionally, it is also possible that the liquid charging level in hopper 2 is adjusted, in particular regulated, for adjusting a certain proportion of liquid. This means that pump 4 is driven in dependence of a measuring signal of charging level sensor 11. The higher the liquid charging level, the more liquid content ultimately is in the foodstuffs to be filled or the finished product, respectively (at a constant delivery rate of the conveying mechanism of the filling machine). For this purpose, control device 9 can comprise a respective control section. It is also possible to adjust the liquid charging level, e.g. visually via an inspection glass, and the conveying rate respectively e.g. manually. Here as well, the nominal height can be determined experimentally for the desired liquid component.

Figure 3:
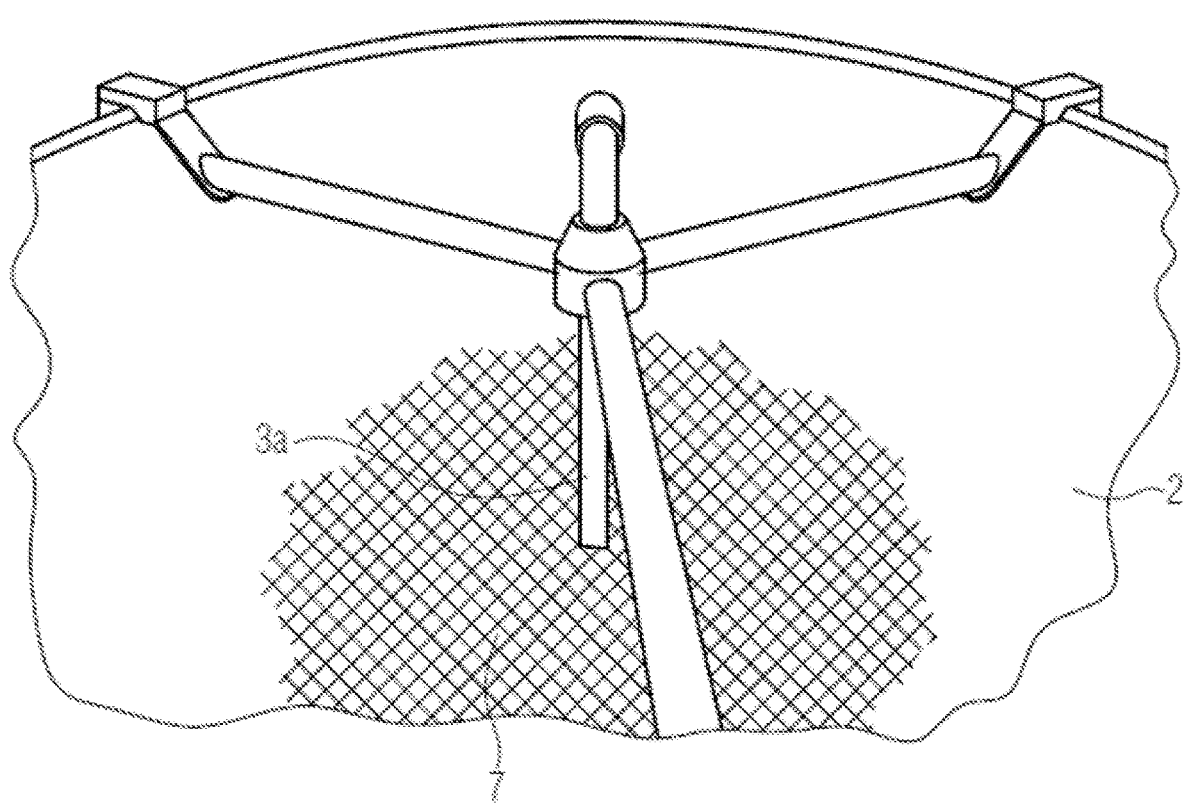
FIG. 3 shows a perspective view of the hopper interior with pieces of filling.

FIG. 3 shows a perspective view of the hopper interior with pieces of filling as well as line 3a for feeding the liquid into the lower region of hopper 2.

Figure 2:
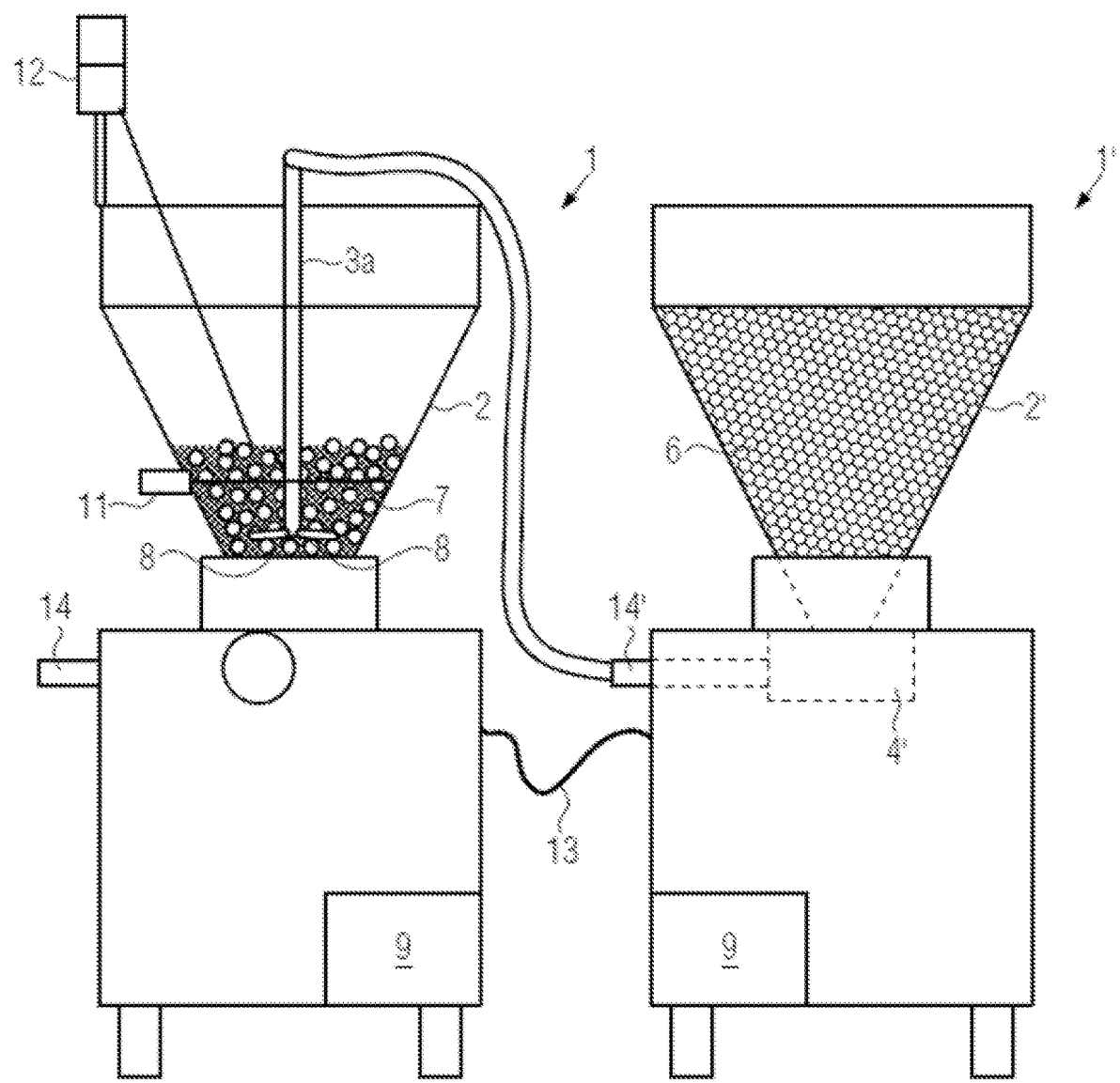
FIG. 2 very schematically shows a longitudinal sectional view through a second embodiment according to the present disclosure with two filling machines.

FIG. 2 shows a further embodiment according to the present disclosure. The embodiment shown in FIG. 2 corresponds to the embodiment shown in FIG. 1, with the exception that the feeding device there comprises a second filling machine 1' instead of container 5 and pump 4. The second filling machine, like the first filling machine, comprises a hopper 2' and a conveying mechanism, where the conveying mechanism of the filling machine there serves as pump 4' for delivering the liquid which is stored in hopper 2', and the liquid is fed via a dosing element 14' to line 3b, 3a and ultimately to the lower region of hopper 2. The control devices of filling machines 1, 1' can be interconnected via a corresponding interface, e.g. an interface cable 13, in such a manner that the control device 9 of filling machine 1 can actuate the pump or conveying mechanism 4' of second vacuum filler 1' or can actuate it via control device 9'. The liquid can be fed into hopper 2' either via a lifting device or a feed line.

The feeding devices described in the previous embodiments were only an example. It is essential that the feeding device is configured in such a way that distribution of the filling in liquid 6 is as uniform as possible. It is for this advantageous if liquid 6 can be introduced in such a manner that it comprises a motion component in the horizontal direction. For example, a tangential inlet or a distributor device with several openings can also alternatively be provided on the hopper wall for this purpose.

The method according the present disclosure shall be explained below in detail with reference to FIGS. 1 and 2.

In the method according to the present disclosure, pieces of filling, as shown in FIG. 3, are fed to hopper 2. It is particularly advantageous if the pieces of filling can be fed continuously via a transport device, such as, for example, a conveyor belt, in such a manner that a certain charging level of filling 7 in hopper 2 can be adjusted. For this purpose, the delivery rate of the transport device can be regulated in dependence of a measuring signal of charging level sensor 12. During the filling process, liquid 6 is via feeding device 3a, 3b, 4 or 4', respectively, added into the lower region of hopper 2. The delivery rate of the feeding device for the pieces of filling is, for example, 500 kg/hour to 2000 kg/hour, and the delivery capacity of pump 4 for the liquid is, for example, 500 kg/hour to 2000 kg/hour.

Due to the liquid added, the pieces of filling can be uniformly flushed up and distributed in the lower region. A conveying mechanism (not shown) then transports the foodstuffs in the direction of a filling element 14, where the filling capacity of the conveying mechanism is in a range from 500 kg to 5000 kg per hour. A food product can therefore be continuously filled having a predetermined proportion of pieces of filling in the liquid, where a proportion of liquid of e.g. 30%-70% can be obtained with the above-mentioned parameters.

As described above, the proportion of pieces of filling or the proportion of liquid in the product can be adjusted by way of the delivery capacity of conveying pump 4, 4'. What the amount to be fed per time or per unit volume of ready-mixed foodstuffs delivered is to be in order to obtain a certain proportion of pieces of filling and liquid, respectively, can be determined experimentally beforehand.

It is also possible that the proportion of liquid is determined by way of the charging level of liquid 6 in hopper 2. As described above, the charging level can be determined by way of charging level sensor 11, for example, by way of an inspection glass, where the charging level is then adjusted or automatically regulated via the delivery capacity of pump 4, 4'. The height, at which the charging level must be for a particular liquid or for the filling component, can be determined experimentally beforehand.

The foodstuff, which then consists of liquid 6 and the predetermined portion 7 of pieces of filling, is fed via the conveying mechanism and conveyor element 14, for example, the stuffing tube, e.g. into sausage casings or respective containers.

Further, FIGS. 1-5B show the relative positioning of various components of the receiver assembly. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:

1. A method for filling mixed foodstuffs comprising a predetermined proportion of pieces of filling in a liquid with the help of a filling machine, comprising:
    a hopper for receiving said pieces of filling;
    a conveying mechanism for conveying foodstuffs from said hopper into a dosing element;
    a feeding device for feeding liquid into a lower region of said hopper, the method comprising the steps of:
    charging said pieces of filling into said hopper,
    adding said liquid during a filling process in a lower region of said hopper, and
    conveying and filling the mixed foodstuffs from said hopper, wherein a certain amount of liquid per time or per unit volume of ready-mixed foodstuffs is during the filling process added for adjusting a certain proportion of liquid, and wherein a delivery capacity of a pump adding said liquid is controlled or regulated.

2. The method according to claim 1, wherein a liquid charging level in said hopper is regulated for adjusting a specific proportion of liquid.

3. The method according to claim 1, wherein a charging level of said pieces of filling is determined, and wherein the charging level of said pieces of filling is adjusted or regulated to a predetermined value or range.

4. The method according to claim 3, wherein the charging level of said pieces of filling is set or regulated so low that it is less than 10% to 50% of a hopper height.

5. The method according to claim 1, wherein charging said hopper with pieces of filling is done by way of a conveying device, where a delivery rate of said conveying device is regulated in dependence of a measured charging level of said pieces of filling.

6. The method according to claim 1, wherein the predetermined proportion of pieces of filling in said foodstuffs is in a range from 30% to 80%, and where a volume of a piece of filling is in a range from 1 cm$^3$ to 80 cm$^3$.

7. The method according to claim 6, wherein the predetermined proportion of pieces of filling in said foodstuffs is in a range from 40% to 70%.

8. The method according to claim 1, wherein said pieces of filling comprise at least one filling from the following groups: pieces of meat, pieces of vegetable, and fish cuttings.

9. The method according to claim 1, wherein said liquid is a liquid from at least one of the following groups: liquid aspic, oils, salad dressings, gravy, soups, and stock.

10. The method according to claim 1, wherein said liquid is introduced in such a manner that it comprises a motion component in a horizontal direction.

11. A filling machine for performing the method according to claim 1, wherein said filling machine comprises a control device which actuates the pump in order to obtain a predetermined proportion of liquid in the foodstuffs.

12. The filling machine according to claim 11, wherein said feeding device comprises a line opening into said lower region of said hopper.

13. The filling machine according to claim 12, wherein said line is configured in such a manner that a direction of motion of said liquid when exiting is substantially horizontal or at least comprises a directional component in a horizontal direction, and where said line is at least in sections disposed centered and comprises lateral outlet openings, or where said line at the lower end comprises a distributor device with several outlet openings.

14. The filling machine according to claim 11, wherein said filling machine comprises a charging level sensor for the liquid and/or a charging level sensor for said pieces of filling.

15. The filling machine according to claim 11, wherein the pump is a conveying mechanism of a second filling machine and is positioned in a hopper of said second filling machine in which said liquid for the foodstuffs is stored, or wherein said pump is a separate liquid pump which feeds liquid from a container to said hopper for receiving the pieces of filling, and where the pump that is the conveying mechanism for feeding liquid from the container to said hopper for receiving pieces of filling is driven by way of a drive of said filling machine.

16. The filling machine according to claim 11, wherein a line of the feeding device comprises a valve.

17. The filling machine of claim 16, wherein the valve is a check valve.

\* \* \* \* \*